United States Patent [19]
Bieck et al.

[11] Patent Number: 5,839,711
[45] Date of Patent: Nov. 24, 1998

[54] HOLDER FOR BEVERAGE CONTAINER

[75] Inventors: Torsten Bieck; Christiane Ziegler, both of Waldachtal; Rüdiger Widulle, München; Carsten Lange, Wolnzach, all of Germany

[73] Assignee: Fischerwerke, Artur Fischer GmbH & Co. KG, Waldachtal, Germany

[21] Appl. No.: 831,618

[22] Filed: Apr. 9, 1997

[30] Foreign Application Priority Data

Apr. 11, 1996 [DE] Germany ................. 296 06 583 U

[51] Int. Cl.⁶ ............................................. A47K 1/08
[52] U.S. Cl. ........................................ 248/313; 248/311.2
[58] Field of Search ........................... 248/313, 311.2, 248/314, 315, 316.2, 316.3, 346.04, 346.01, 346.11, 346.07; 224/552, 571, 926; 220/739, 903

[56] References Cited

U.S. PATENT DOCUMENTS

| | | | |
|---|---|---|---|
| 358,688 | 3/1887 | Nassauer | 248/154 |
| 2,531,131 | 11/1950 | Johnson | 248/129 |
| 2,851,185 | 9/1958 | Taylor | 248/346.04 |
| 2,968,888 | 1/1961 | Borah | 248/346.11 |
| 3,049,137 | 8/1962 | Cole | 248/313 |
| 5,054,733 | 10/1991 | Shields | 248/313 |
| 5,071,096 | 12/1991 | Hartman et al. | 248/154 |
| 5,135,195 | 8/1992 | Dane | 248/314 |
| 5,143,338 | 9/1992 | Eberlin | 248/313 |
| 5,154,380 | 10/1992 | Risca | 248/154 |
| 5,445,350 | 8/1995 | Rigsby | 248/313 |

FOREIGN PATENT DOCUMENTS

| | | |
|---|---|---|
| 4224701A1 | 1/1994 | Germany . |
| 4404078A1 | 8/1995 | Germany . |

*Primary Examiner*—Ramon O. Ramirez
*Assistant Examiner*—Anita M. King
*Attorney, Agent, or Firm*—Michael J. Striker

[57] ABSTRACT

A holder for a beverage container has a body having a container receptacle for receiving a beverage container; at least one holding jaw; a spring element pressing the at least one holding jaw into the container receptacle, the at least one holding jaw having supporting surfaces arranged at different radial distances from a center of the container receptacle and pivoting and linear bearing attaching the holding jaw to the body.

7 Claims, 1 Drawing Sheet

HOLDER FOR BEVERAGE CONTAINER

BACKGROUND OF THE INVENTION

The present invention relates to a holder for beverage containers, which holder is intended to be arranged in a vehicle.

Holders for beverage containers are known in the art. Such holders have a container receptacle which for example is pot-shaped and formed to receive cups, beakers, beverage cans and the like. The known holders preferably are provided with plurality of holding jaws which are distributed around the circumference. They are pressed into the container receptacle by a spring element and abut against a circumferential surface of the inserted beverage container to support the container in the container receptacle. However, the known holders are suitable only for drink containers having a specific diameter.

SUMMARY OF THE INVENTION

Accordingly, it is an object of present invention to provide a holder for beverage containers, which is formed so that beverage containers of different diameters can be securely supported in the holder.

In keeping with these objects and with others which will become apparent hereinafter, one feature of the present invention resides, briefly stated, in a holder for a beverage container, in which the holding jaw has supporting surfaces arranged at different radial distances from a center of a container receptacle, and the holding jaw is attached to the holder by a pivoting and linear bearing means.

The holding jaws of the holder have a plurality of clamping surfaces that project by varying distances into the container receptacle. That ensures that the holding jaws abut with the appropriate clamping surfaces against the beverage containers of small diameter as well. A further advantage is that the spring force by which the holding jaws pass against the beverage container depends only slightly on the diameter of the beverage container and is of approximately identical magnitude in the case of beverage containers having large and small diameters.

According to the invention, the holding jaws are attached to the holder for example at their two ends, by a pivoting and linear bearing. The pivoting and linear bearings enable pivoting and displacement movement of the holding jaws out of the container receptacle. Therefore, on insertion of a beverage container into the container receptacle, the holding jaws can be pressed apart by the beverage container against the force of the spring element, to the diameter of the beverage container. Such mounting makes the holding jaws highly adaptable to each inserted drink container.

In accordance with another advantageous feature of the present invention, the spring element is formed as an open circular ring, a closed circular ring or a band. It engages around the container receptacle and engages the holding jaws so as to press them into the container receptacle. The spring element can be composed preferably of synthetic elastomeric material.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
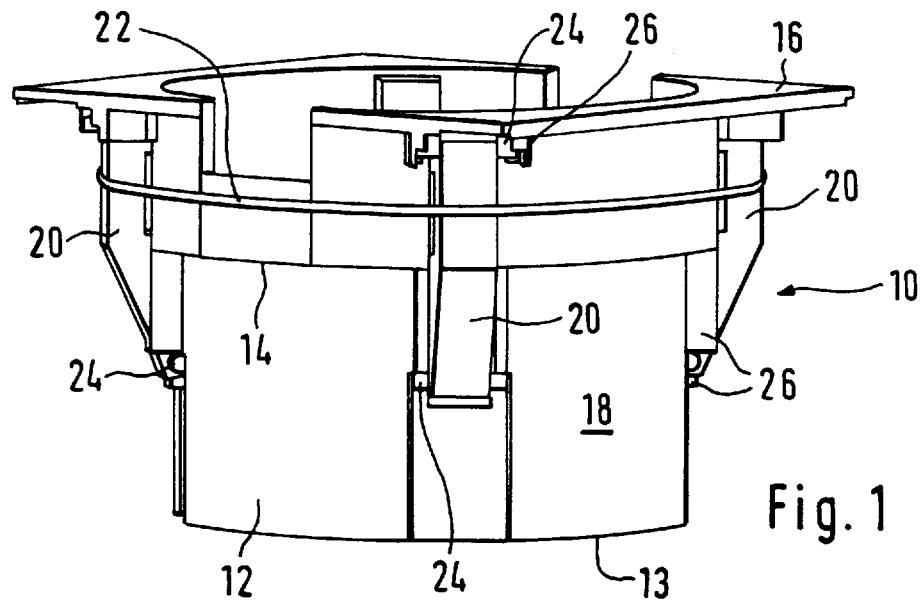
FIGS. 1 and 2 are perspective views of a holder for beverage containers in accordance with the present invention, as seen from two different directions.
Figure 2:
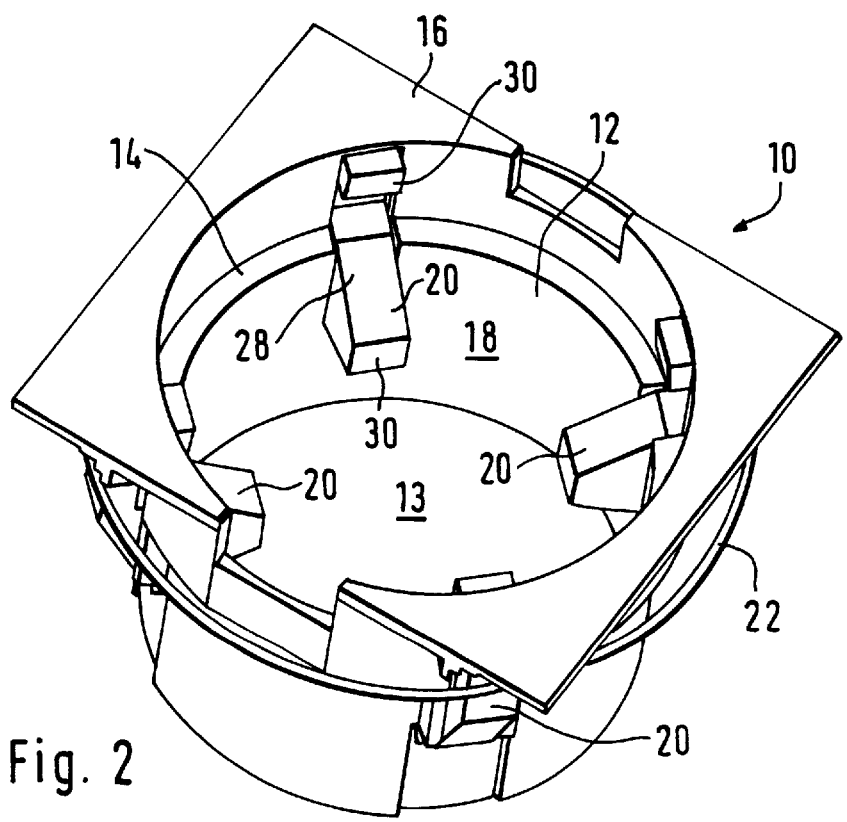

A holder for beverage containers to be arranged in a vehicle is identified as a whole with reference numeral 10. The holder is formed for insertion of a beverage container formed as a cup, a beaker, a beverage can and the like. The holder 10 is provided with a pot-shaped container receptacle 12 having a bottom 13. The container receptacle 12 has an upper portion and a lower portion of different diameters which are separated from one another by an angular step 14. Therefore, beverage containers of different diameters can be inserted in the container receptacle. At the open upper side of the container receptacle 12, a body of the holder 10 merges integrally into a rectangular, flange part 16. The flange part 16 is provided for closing of a fitting opening for the holder 10 in the motor vehicle.

A plurality of holding jaws 20, for example four holding jaws, are arranged in openings of a circumferential wall 18 of the container receptacle 12. They are distributed around the circumference of the wall. The holding jaws 20 are pressed into the container receptacle 12 radially by a common spring ring 22. The spring ring is composed of a synthetic elastomeric material. The spring ring runs around the outside of the container receptacle 12 and engages the holding jaws 20 from the outside.

Pegs 24 are provided at the upper and lower ends of the holding jaws 20. The pegs project laterally and engage in guides 26 on the outside of the circumferential wall 18 of the container receptacle 12. The guides are open to the outside and run radially in relation to the container receptacle 12. The pegs 24 and the guides 26 form pivoting and linear bearings that enable a pivoting movement of the holding jaws 20 about the pegs 24 and a linear movement outwards from the container receptacle 12. The pegs 24 are held in engagement with the guides 26 by the spring ring 20 that presses the holding jaws 20 inwards. The pivoting and linear bearings 24, 26 enable an automatic adjustment of the holding jaws 20 to the diameter of a beverage container inserted into the container receptacle 12 of the holder 10.

The holding jaws 20 have an inclined surface 28 which faces upwards. When a beverage container is inserted into the container receptacle 12, its slides along the inclined surface 28 and the holding jaws 20 are pressed outwards radially until they abut against the circumference of the beverage container.

Each of the holding jaws 20 has two supporting surfaces 30. They are located in approximately secant planes of the container receptacle 12 and are provided for abutting against a circumference of an inserted beverage container. The supporting surfaces 30 are located at different radii and are provided for different beverage containers of varying diameters.

It will be understood that each of the elements described above, or two or more together, may also find a useful application in other types of constructions differing from the types described above.

While the invention has been illustrated and described as embodied in holder for beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holder for a beverage container, comprising a body having a container receptacle for receiving a beverage container; at least one holding jaw; a spring element pressing said at least one holding jaw into said container receptacle, said at least one holding jaw having a supporting surface; and pivoting and linear bearing means attaching said holding jaw to said body, said spring element being formed as an open circular ring which engages around said container receptacle.

2. A holder for a beverage container, comprising a body having a container receptacle for receiving a beverage container; at least one holding jaw; a spring element pressing said at least one holding jaw into said container receptacle, said at least one holding jaw having a supporting surface; and pivoting and linear bearing means attaching said holding jaw to said body, said spring element being formed as a closed circular ring which engages around said container receptacle.

3. A holder for a beverage container, comprising a body having a container receptacle for receiving a beverage container; at least one holding jaw; a spring element pressing said at least one holding jaw into said container receptacle, said at least one holding jaw having a supporting surface; and pivoting and linear bearing means attaching said holding jaw to said body, said spring element being formed as a band which engages around said container receptacle.

4. A holder for a beverage container, comprising a body having a container receptacle for receiving a beverage container; at least one holding jaw; a spring element pressing said at least one holding jaw into said container receptacle, said at least one holding jaw having a supporting surface; and pivoting and linear bearing means attaching said holding jaw to said body, said pivoting and linear bearing means including a guide provided on a circumferential wall of said container receptacle and a peg provided in said at least one holding jaw and projecting into said guide.

5. The holder as defined in claim 1; and further comprising another holding jaw having a supporting surface, said spring element pressing said holding jaws into said container receptacle, said holding jaws having supporting surfaces which are arranged at different radial distances from a center of said container receptacle.

6. The holder for a beverage container, comprising a body having a container receptacle for receiving a beverage container; at least two holding jaws having supporting surfaces; a spring element pressing said holding jaws into said container receptacle, said supporting surfaces of said holding jaws being arranged at different radial distances from a center of said container receptacle.

7. The holder as defined in claim 1, wherein said spring element is composed of a synthetic elastomeric material.

* * * * *